(12) United States Patent
Takanashi et al.

(10) Patent No.: US 8,570,481 B2
(45) Date of Patent: Oct. 29, 2013

(54) LIQUID CRYSTAL MATERIAL, LIQUID CRYSTAL DISPLAY DEVICE, LIQUID CRYSTAL OPTICAL SPACE MODULATION DEVICE, AND LIQUID CRYSTAL SHUTTER

(75) Inventors: Hidehiko Takanashi, Kanagawa (JP); Ken Kobayashi, Kanagawa (JP); Rika Kotake, Kanagawa (JP); Aya Shuto, Kanagawa (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 12/914,053

(22) Filed: Oct. 28, 2010

(65) Prior Publication Data
US 2011/0102731 A1    May 5, 2011

(30) Foreign Application Priority Data
Nov. 4, 2009  (JP) .................................. 2009-253361

(51) Int. Cl.
*C09K 19/02*    (2006.01)
(52) U.S. Cl.
USPC .......................................... 349/171; 349/168
(58) Field of Classification Search
USPC ................................................. 349/168, 171
See application file for complete search history.

(56) References Cited

U.S. PATENT DOCUMENTS 5,853,613 A * 12/1998 Goodby et al. .......... 252/299.63

OTHER PUBLICATIONS

Garoff, Stephen et al., "Electroclinic Effect at the A—C Phase Change in Chiral Smectic Liquid Crystal", Physical Review Letters, pp. 848-851, Apr. 11, 1977, vol. 38, No. 15, Harvard University, Cambridge, MA.
Naciri, J. et al., "Novel Ferroelectric and Electroclinic Organosiloxane Liquid Crystals", Chemical Materials, 1995, pp. 1397-1402, vol. 7, American Chemical Society, Washington, DC.

* cited by examiner

*Primary Examiner* — Phu Vu
(74) *Attorney, Agent, or Firm* — Wolf, Greenfield & Sacks, P.C.

(57) ABSTRACT

A liquid crystal material in which liquid crystal molecules have uniform alignment state is provided. A liquid crystal layer containing a liquid crystal material is included between a TFT array substrate and an opposed substrate. The liquid crystal material has a phase system continuously showing an isotropic phase, a nematic phase, and a smectic 'A' phase in this order as temperature changes from higher state to lower state and shows electroclinic effect in the smectic 'A' phase. As the liquid crystal material is heated (temperature is increased), the nematic phase is shown after the smectic 'A' phase without other phase in between, and the isotropic phase is shown after the nematic phase without other phase in between. Since the alignment state of the liquid crystal molecules becomes uniform, the transmittance is precisely controlled.

14 Claims, 2 Drawing Sheets

LIQUID CRYSTAL MATERIAL, LIQUID CRYSTAL DISPLAY DEVICE, LIQUID CRYSTAL OPTICAL SPACE MODULATION DEVICE, AND LIQUID CRYSTAL SHUTTER

BACKGROUND OF THE INVENTION

1. Field of the Invention

The present invention relates to a liquid crystal material showing a smectic 'A' phase, a liquid crystal display device, a liquid crystal optical space modulation device, and a liquid crystal shutter using the same.

2. Description of the Related Art

In recent years, an active matrix drive system liquid crystal display (LCD) using a thin film transistor (TFT) has been widely used for the purpose from a small device such as a mobile device to a large equipment such as a large screen television. In the LCD, the response speed of a liquid crystal material has been speeded up by adopting impulse drive system or the like. However, since the response speed of the liquid crystal material itself is fundamentally slow, there is a disadvantage that out-of-focus video or the like is easily generated. Thus, the video display quality of the LCD remains in a state of being inferior to that of a plasma display panel (PDP), a field emission display (FED) and the like.

For attaining high speed response of the LCD, the frame rate has been changed from 60 Hz to 120 Hz or 240 Hz (high frame rate drive). However, though the video display quality of the LCD somewhat surely depends on a drive system factor including the TFT, the video display quality of the LCD essentially depends on response characteristics of the liquid crystal material itself largely. Thus, unless the response characteristics of the liquid crystal material itself are improved, essential resolution is not able to be obtained, resulting in inability to realize high frame rate drive substantially. Therefore, to realize superior video display quality in the LCD, it has been aspired to attain a liquid crystal material capable of realizing high speed response that is able to address high frame rate drive.

As the liquid crystal material capable of realizing high speed response, nematic liquid crystal (flexoelectric effect), ferroelectric liquid crystal, antiferroelectric liquid crystal and the like are known. In recent years, smectic liquid crystal (electroclinic effect of a smectic 'A' phase) has been studied.

The electroclinic effect is a phenomenon as follows. In other words, in the case where an electric field is applied to an uniaxially aligned liquid crystal material (liquid crystal molecules) in the smectic 'A' phase, the optical axis (long axis) of the liquid crystal molecules is tilted according to the electric field intensity (for example, refer to Physical Review Letters, vol. 38, 1977, p 848, Garpff et al.). In this case, in the case where the liquid crystal material is arranged between two polarizing plates with each polarization direction perpendicular to each other, the transmitted light amount is changed according to the angle (tilt angle) between the optical axis of the polarizing plate and the optical axis of the liquid crystal molecules. The transmitted light amount is expressed by expression $T/T_0 = \sin^2(2\theta) \times \sin^2(\pi \Delta nd/\lambda)$, where T represents the transmitted light amount, $T_0$ represents an incident light amount, $\theta$ represents a tilt angle, $\Delta n$ represents a double reflex of the liquid crystal material, d represents a thickness of a liquid crystal layer, and $\lambda$ represents a wavelength of the transmitted light. Based on the expression, in the case where the tilt angle is +/−45 degree, the transmittance becomes the maximum. The correlation between transmittance in retardation (=$\Delta nd$) when the tilt angle is the maximum and the tilt angle (degree) is as illustrated in FIG. 4.

Due to the electroclinic effect, the response time of the liquid crystal material becomes from several μs to several tens μs, and thus the response speed thereof becomes largely increased. In this case, since the tilt angle is proportional to the electric field intensity in the range of low field electric intensity, voltage modulation of the transmittance is enabled. Thus, display mode using the electroclinic effect is significantly suitable for the active matrix drive system, and is useful not only for the LCD but also for other optical devices.

However, in the existing liquid crystal material demonstrating the electroclinic effect, the alignment state of liquid crystal molecules is not sufficiently uniform. Thus, in the past, in the LCD using the existing liquid crystal material demonstrating the electroclinic effect, the transmittance has been hardly controlled precisely, and thus sufficient contrast has not been obtained.

Therefore, in the past, to uniform the alignment state of liquid crystal molecules, a technique to apply a large electric field when an isotropic phase is shifted to the smectic 'A' phase in the course of decreasing temperature has been adopted (for example, refer to Chem. Mater, 7, 1995, pp. 1397 to 1402, Naciri et al.). However, in the foregoing technique, there are disadvantages that alignment defect easily occur and the procedure is complicated. Further such disadvantages do not result in sufficiently uniform alignment state of the liquid crystal molecules.

SUMMARY OF THE INVENTION

For realizing high speed response of the liquid crystal material, electroclinic effect is effective. However, alignment state of liquid crystal molecules demonstrating such an effect is not sufficiently uniform. Thus, it has been aspired to uniform the alignment state of the liquid crystal molecules of the liquid crystal material demonstrating such an electroclinic effect as much as possible.

In view of the foregoing disadvantage, in the invention, it is desirable to provide a liquid crystal material in which liquid crystal molecules have a uniform alignment state, and a liquid crystal display device, a liquid crystal optical space modulation device, and a liquid crystal shutter that are capable of precisely controlling transmittance by using the same.

According to an embodiment of the invention, there is provided a liquid crystal material that has a phase system continuously showing an isotropic phase, a nematic phase, and a smectic 'A' phase in this order as temperature changes from higher state to lower state, and shows electroclinic effect in the smectic 'A' phase. Further, according to an embodiment of the invention, there is provided a liquid crystal display device, a liquid crystal optical space modulation device, or a liquid crystal shutter including a liquid crystal layer between a pair of substrates, and the liquid crystal layer contains the foregoing liquid crystal material.

"Continuously showing an isotropic phase, a nematic phase, and a smectic 'A' phase in this order as temperature changes from higher state to lower state" means a phase system not showing a phase other than the foregoing three types of liquid crystal phases in the course of phase shift (phase transition) from the isotropic phase to the smectic 'A' phase. In other words, in such a phase system, as the liquid crystal material is heated (temperature is increased), the nematic phase is shown after the smectic 'A' phase without other phase in between, and the isotropic phase is shown after the nematic phase without other phase in between.

The electroclinic effect is a phenomenon as follows. In other words, as described above, in the case where an electric field is applied to uniaxially aligned liquid crystal molecules in the smectic 'A' phase, the optical axis of the liquid crystal molecules is tilted according to the electric field intensity. Whether the liquid crystal material is able to demonstrate the electroclinic effect in the smectic 'A' phase is able to be checked by examining whether the optical axis of the liquid crystal molecules is tilted relative to the direction perpendicular to the layer surface (normal line direction) when an electric field is applied in parallel with the surface of the liquid crystal layer showing the smectic 'A' phase. If the optical axis of the liquid crystal molecules is tilted relative to the normal direction, the electroclinic effect is able to be demonstrated.

In the liquid crystal display device, if an electric field is applied to the liquid crystal layer, the long axis of the liquid crystal material (liquid crystal molecules) is tilted and the transmittance of the liquid crystal layer is changed. In the liquid crystal optical space modulation device, if an electric field is applied to the liquid crystal layer, the long axis of the liquid crystal material is tilted and light entering the liquid crystal layer is spatially modulated. In the liquid crystal shutter, if an electric field is applied to the liquid crystal layer, the long axis of the liquid crystal material is tilted and a light path is opened or closed by the liquid crystal layer.

The liquid crystal material of the embodiment of the invention has the phase system continuously showing the isotropic phase, the nematic phase, and the smectic 'A' phase in this order as temperature changes from higher state to lower state, and shows the electroclinic effect in the smectic 'A' phase. Thus, compared to a case not having the foregoing phase system, the alignment state of the crystal molecules becomes more uniform. Thus, according to the liquid crystal display device, the liquid crystal optical space modulation device, or the liquid crystal shutter that use the liquid crystal material of the embodiment of the invention, transmittance is able to be precisely controlled.

Other and further objects, features and advantages of the invention will appear more fully from the following description.

DETAILED DESCRIPTION OF THE PREFERRED EMBODIMENT

Figure 1:
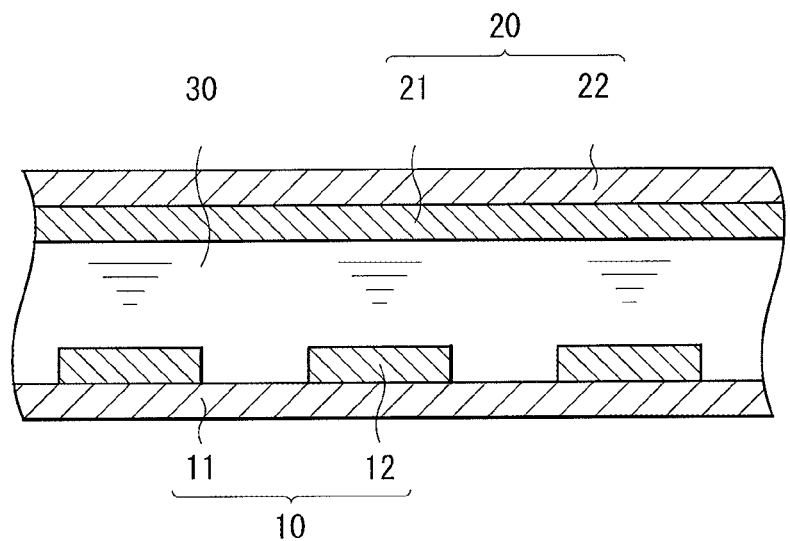
FIG. 1 is a cross sectional view illustrating a structure of a main section of a liquid crystal display device using a liquid crystal material of an embodiment of the invention.

An embodiment of the invention will be hereinafter described in detail with reference to the drawings. The description will be given in the following order:
1. Liquid crystal material
2. Liquid crystal display device using liquid crystal material
3. Liquid crystal optical space modulation device using liquid crystal material
4. Liquid crystal shutter using liquid crystal material
 1. Liquid Crystal Material
 First, a description will be given of a liquid crystal material of an embodiment of the invention. The liquid crystal material herein described is used for the purpose of various optical devices. Examples of optical devices include a liquid crystal display device such as the after-mentioned LCD, an optical space modulation device such as a light polarization switch, and a liquid crystal shutter such as shutter glasses.

The liquid crystal material has characteristics to form a smectic liquid crystal layer (show an uniaxially aligned smectic 'A' phase) in a usage temperature range of a relevant optical device. The smectic liquid crystal layer is a liquid crystal layer in which long axes of liquid crystal molecules are aligned in the form of laminae. The smectic 'A' phase is a liquid crystal phase in which the normal line direction of the smectic liquid crystal layer corresponds with the long axis direction of the liquid crystal molecules. The usage temperature range of a relevant optical device is a temperature range in which various optical devices and the like are generally used, and is, for example, from 20 degree centigrade to 50 degree centigrade both inclusive. However, the whole temperature range may be slightly shifted to the low temperature side and the high temperature side if the temperature range from 20 degree centigrade to 50 degree centigrade both inclusive is included therein.

In particular, the liquid crystal material has a phase system continuously showing an isotropic phase, a nematic phase, and the smectic 'A' phase (hereinafter simply referred to as "three types of liquid crystal phases") in this order as temperature changes from higher state to lower state, and shows electroclinic effect in the smectic 'A' phase. The liquid crystal material has the foregoing phase system for the following reason. In other words, the alignment state of the liquid crystal molecules becomes more uniform compared to a case that the liquid crystal material does not have the phase system.

The liquid crystal material may have a cholesteric phase instead of the nematic phase. In this case, since the liquid crystal material has a phase system continuously showing the isotropic phase, the cholesteric phase, and the smectic 'A' phase in this order as temperature changes from higher state to lower state, alignment state of the liquid crystal molecules becomes uniform as in the case having the nematic phase.

The width of the temperature zone in which the liquid crystal material shows the nematic phase (or the cholesteric phase) is not particularly limited, but is preferably wide as much as possible. Specifically, the width of temperature zone in which the liquid crystal material shows the nematic phase (or the cholesteric phase) is preferably 1 degree centigrade (1 K (Kelvin)) or more. Since thereby the nematic phase having a sufficient width of the temperature zone exists between the isotropic phase and the smectic 'A' phase, alignment state of the liquid crystal molecules easily becomes uniform.

Whether the liquid crystal material shows the three types of liquid crystal phases is able to be checked by using a known technique, a known equipment and the like. Specifically, for example, presence of phase transition is able to be checked by measuring temperature of the liquid crystal material with the use of differential scanning calorimetry. Further, for example, liquid crystal phase type is able to be identified by observing the liquid crystal material by a polarization microscope while the liquid crystal material is heated by a hot stage or the like. Therefore, it is able to check whether the liquid crystal material shows the three types of liquid crystal phases, in other words, whether the smectic 'A' phase, the nematic phase (or the cholesteric phase), and the isotropic phase are continuously shown in this order when the liquid crystal material is heated.

The liquid crystal material may show other one or more liquid crystal phases in addition to the three types of liquid crystal phases. However, since the three types of liquid crystal phases continuously exist from the high temperature side in the phase system. Thus, other liquid crystal phases exist on the lower temperature side than the smectic 'A' phase. Examples of other liquid crystal phases include a smectic 'C' phase and a crystal phase. In addition, a smectic phase other than the smectic 'A' phase and the smectic 'C' phase may be included. Regarding the smectic phase, various types of phases exist in addition to the smectic 'A' phase and the smectic 'C' phase.

The liquid crystal material may be a single material or may be a mixture of two or more materials, as long as the three types of liquid crystal phases are shown as a whole. In particular, in the case where the liquid crystal material is the mixture of two or more materials, it is enough that the three types of liquid crystal phases are shown in the mixture even if the three types of liquid crystal phases are not shown in each single material.

Examples of liquid crystal materials capable of showing the three types of liquid crystal phases independently include materials expressed by Formula 1(1) to Formula 1(35). Meanwhile, for example, materials expressed by Formula 2 is not able to show the three types of liquid crystal phases independently.

Formula 1

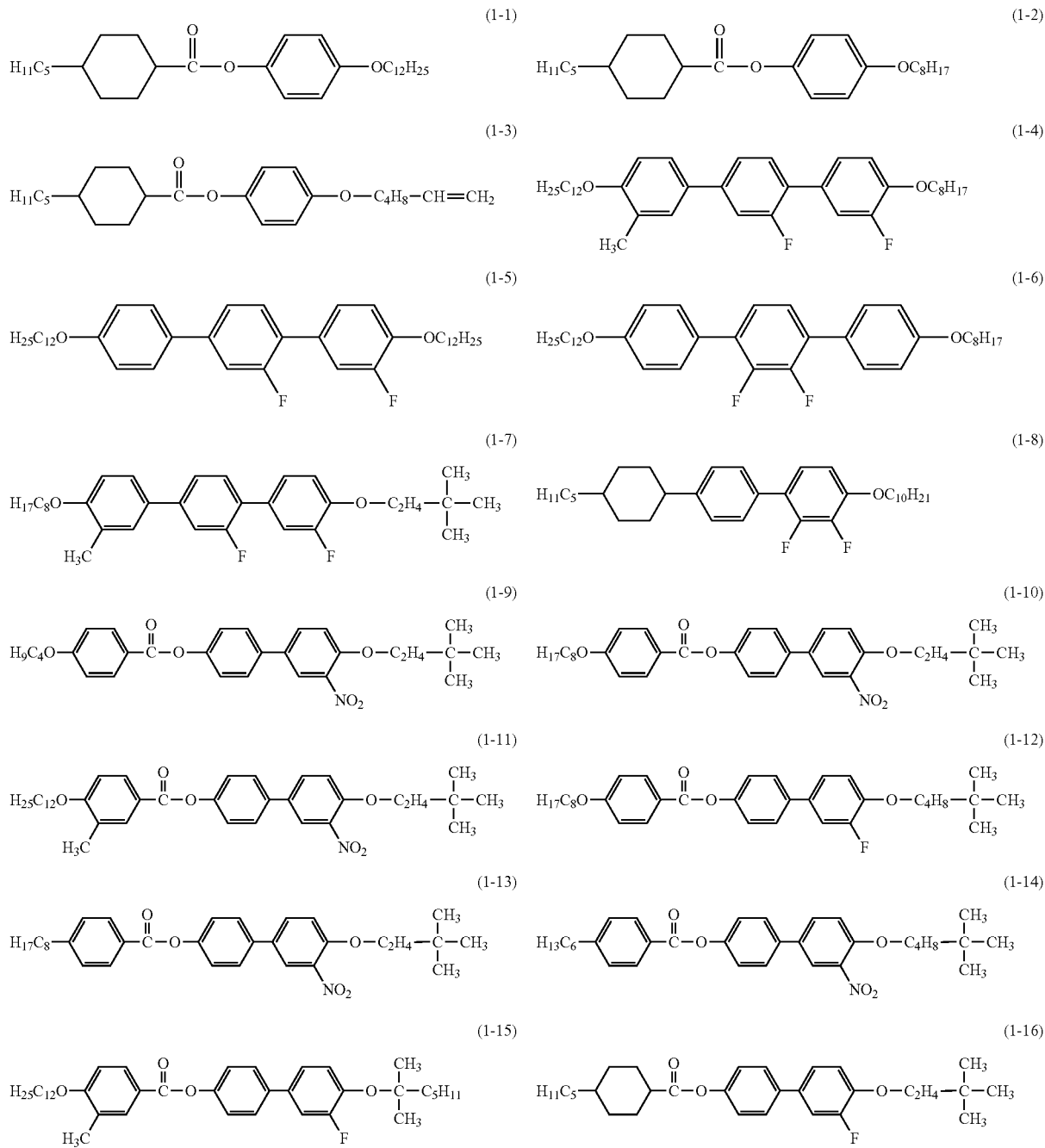

-continued
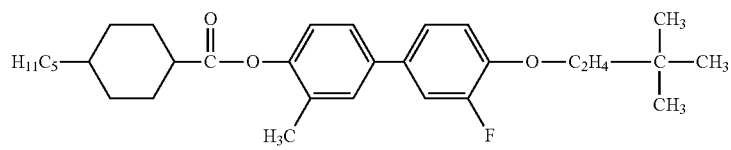 (1-17)
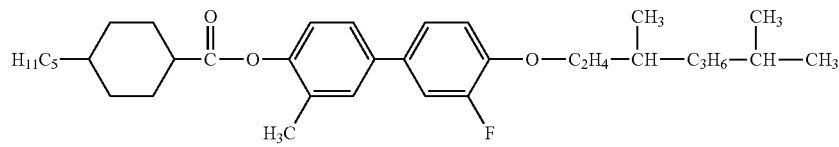 (1-18)
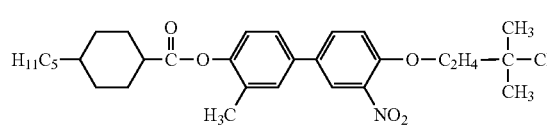 (1-19)
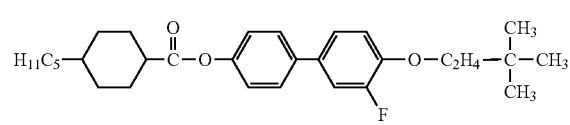 (1-20)
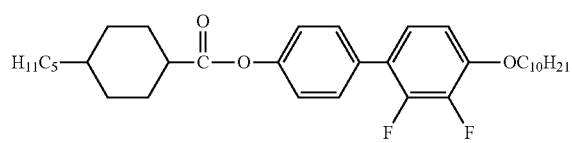 (1-21)
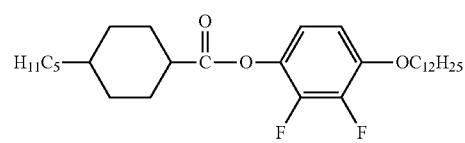 (1-22)
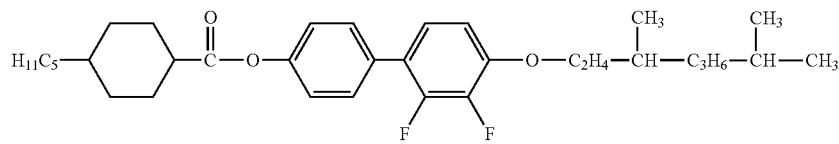 (1-23)
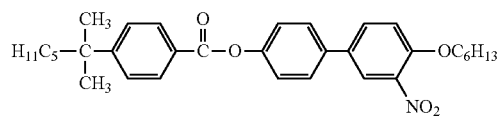 (1-24)
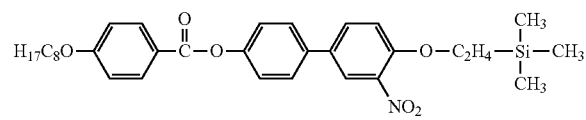 (1-25)
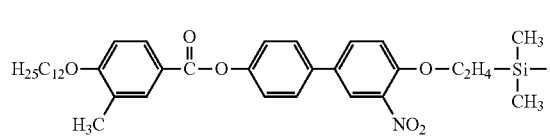 (1-26)
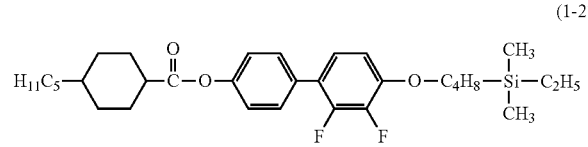 (1-27)
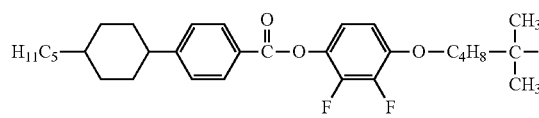 (1-28)
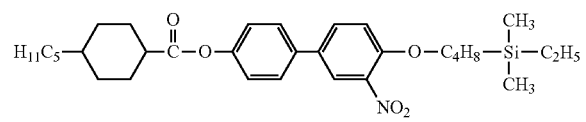 (1-29)
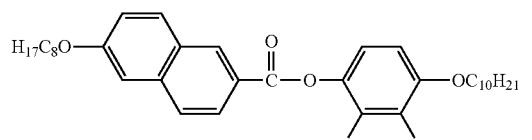 (1-30)
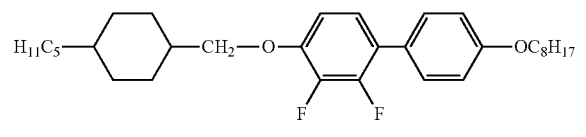 (1-31)
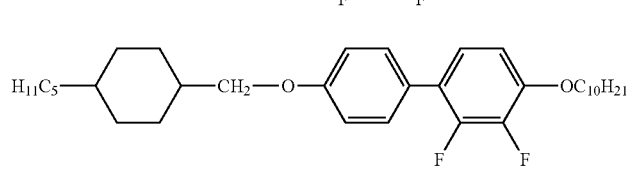 (1-32)

-continued

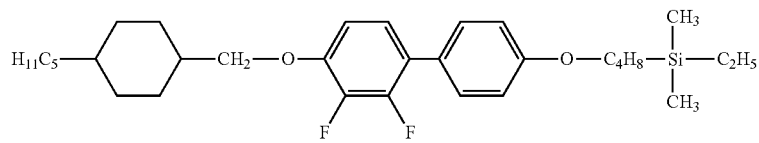
(1-33)

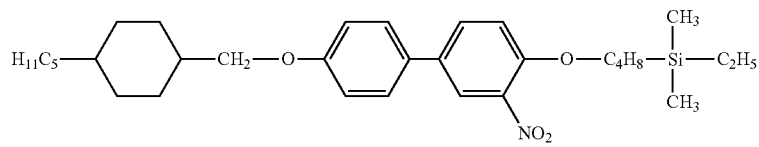
(1-34)

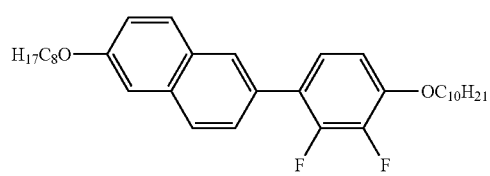
(1-35)

Formula 2

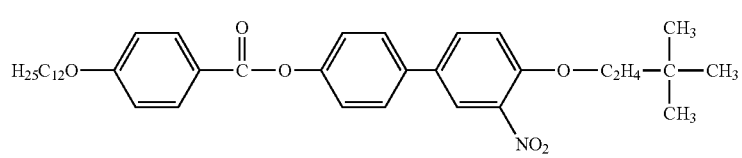
(2)

Further, examples of materials incapable of showing the three types of liquid crystal phases independently but capable of showing the three types of liquid crystal phases in a state of a mixture include a mixture of materials expressed by Formula 3(1) and Formula 3(2).

Formula 3

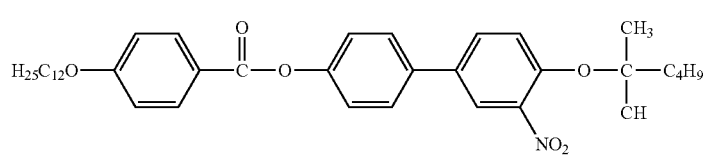
(3-1)

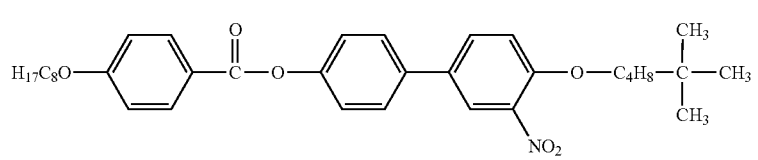
(3-2)

The liquid crystal material has the phase system continuously showing the isotropic phase, the nematic phase, and the smectic 'A' phase in this order as temperature changes from higher state to lower state, and shows electroclinic effect in the smectic 'A' phase. Thus, the alignment state of the liquid crystal molecules becomes thereby more uniform compared to a case not having the foregoing phase system. Thus, in the liquid crystal material demonstrating the electroclinic effect, uniform alignment state is able to be obtained. In this case, in particular, in the case where the width of the temperature zone showing the nematic phase is 1 degree centigrade or more, the alignment state is able to be more uniform.

Next, a description will be given of some application examples of the liquid crystal material of the invention.

2. Liquid Crystal Display Device Using Liquid Crystal Material

The liquid crystal material of the invention is applied to, for example, a liquid crystal display device. FIG. 1 is a cross sectional view illustrating a structure of a main section of the liquid crystal display device.

The liquid crystal display device herein described is a direct view type display device in which an image is formed by controlling light transmittance with the use of the liquid crystal material, and the image is directly viewed by an observer. Specific examples of the liquid crystal display device include a direct view type LCD and a high temperature polysilicon TFT-LCD.

The liquid crystal display device illustrated in FIG. 1 is, for example, an active matrix drive system transmissive liquid crystal display device using a TFT, and includes a liquid crystal layer 30 between a TFT array substrate 10 and an opposed substrate 20 as a pair of substrates.

In the TFT array substrate 10, a pixel electrode 12 is formed in a state of matrix on one face of a support substrate 11. The support substrate 11 is made of, for example, a transmissive material such as glass. The pixel electrode 12 is, for example, made of a transmissive conductive material such as indium tin oxide (ITO). The pixel electrode 12 is connected with a drive circuit (not illustrated) for selecting a pixel including a switching-use TFT.

In the opposed substrate 20, an opposed electrode 22 is formed on the whole area of one face of a support substrate 21. The support substrate 21 is made of, for example, a transmissive material such as glass. The opposed electrode 22 is, for example, made of a conductive material such as ITO.

The TFT array substrate 10 and the opposed substrate 20 are arranged so that the pixel electrode 12 and the opposed electrode 22 are opposed to each other with the liquid crystal layer 30 in between, and are bonded with each other by a sealing material to be apart from each other by a spherical or columnar spacer (not illustrated). On the side contacted with the liquid crystal layer 30 of both substrates, an alignment film (not illustrated) is provided.

The liquid crystal layer 30 is a liquid crystal mixture containing the liquid crystal material of the invention, and is enclosed between the TFT array substrate 10 and the opposed substrate 20.

In addition, the liquid crystal display device includes, for example, other component such as a phase difference plate, a polarizing plate, an alignment film, and a backlight unit (all not illustrated). The backlight unit includes a light source such as a light emitting diode (LED).

In the liquid crystal display device, in the case where an electric field is applied between the pixel electrode 12 and the opposed electrode 22, a tilt angle of the liquid crystal molecules is changed by electroclinic effect according to the electric field intensity. Therefore, the transmission amount (transmittance) of light generated from the backlight unit is controlled, and thus a tone image is displayed.

At this time, for example, 1H (H is a horizontal scanning time period) inversion drive system, 1F (F is a field) inversion drive system or the like is used. In these AC drive systems, color level (tone) is changed according to the height of a drive voltage (amplitude size). In this case, if the drive voltage is increased, image contrast is improved.

According to the liquid crystal display device, since the liquid crystal layer 30 contains the liquid crystal material of the invention, the transmittance is able to be precisely controlled. Therefore, superior video display quality and superior tone are able to be obtained, and in particular, contrast is able to be largely improved.

3. Liquid Crystal Optical Space Modulation Device Using Liquid Crystal Material

Figure 2:
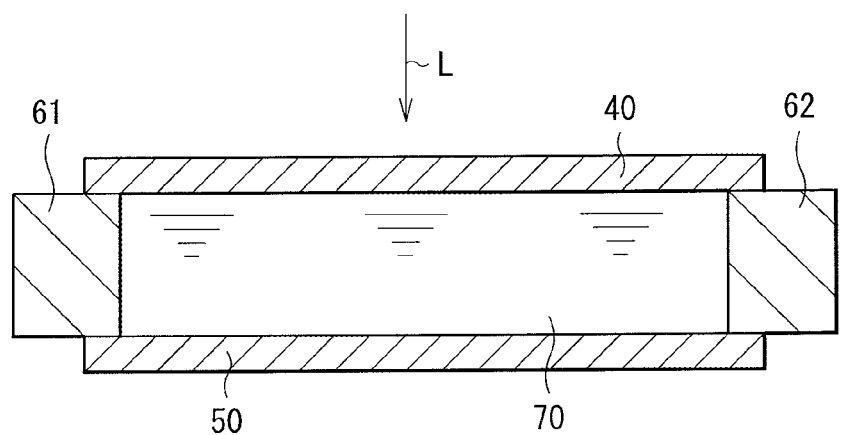
FIG. 2 is a cross sectional view illustrating a structure of a main section of a liquid crystal optical space modulation device using the liquid crystal material of the embodiment of the invention.

Further, the liquid crystal material of the invention is applied to, for example, a liquid crystal optical space modulation device. FIG. 2 is a cross sectional view illustrating a structure of the main section of the liquid crystal optical space modulation device.

The liquid crystal optical space modulation device herein described is a device to two-dimensionally fractionate light generated from the light source, and change each intensity, each phase and the like of each light beam. Specific examples of such a liquid crystal optical space modulation device include a micro liquid crystal device (liquid crystal on silicon (LCoS)) or a light bulb used for a projection display and a light polarization switch. The light bulb has, for example, a structure approximately similar to that of the foregoing liquid crystal display device. In this case, light generated from the light source is divided into red light, green light, and blue light, each color light is modulated by three light bulbs having a structure similar to that of the liquid crystal display device and is subsequently synthesized, and therefore an image is extended and projected on the projection face.

The liquid crystal optical space modulation device illustrated in FIG. 2 is, for example, a light polarization switch, and includes a liquid crystal layer 70 containing a liquid crystal material of the invention between transparent substrates 40 and 50 as a pair of substrates. The transparent substrates 40 and 50 are separated by electrodes 61 and 62 that are oppositely arranged to sandwich the liquid crystal layer 70. An AC electric field is applied between the electrodes 61 and 62 from a drive equipment such as an AC power source (not illustrated).

The transparent substrates 40 and 50 are made of a transmissive material such as glass, and are oppositely arranged so that each main face is in parallel with each other. Each opposed face of the transparent substrates 40 and 50 (face on the side opposed to each other) is coated with, for example, a vertical alignment agent. In the case where an electric field is not applied between the electrodes 61 and 62, long axes of liquid crystal molecules are vertically aligned in relation to the main face.

In the liquid crystal optical space modulation device, in the case where light L vertically enters the transparent substrate 40, the light L is polarized in the direction perpendicular to the electric field direction by electric field E applied between the electrodes 61 and 62, and is output from the transparent substrate 50. In this case, if E is 0, the light L is not polarized. Meanwhile, if E is larger than 0, the light L is polarized in the direction perpendicular to the electric field direction (+direction), and if E is smaller than 0, the light L is polarized in the opposite direction of the direction in the case that E is larger than 0 (−direction). At this time, the polarization amount (shift amount) is changed according to the electric field intensity.

According to the liquid crystal optical space modulation device, the liquid crystal layer 70 contains the liquid crystal material of the invention. Thus, transmittance is able to be precisely controlled as in the liquid crystal display device. Therefore, sufficient optical modulation is able to be obtained.

4. Liquid Crystal Shutter Using Liquid Crystal Material

Figure 3:
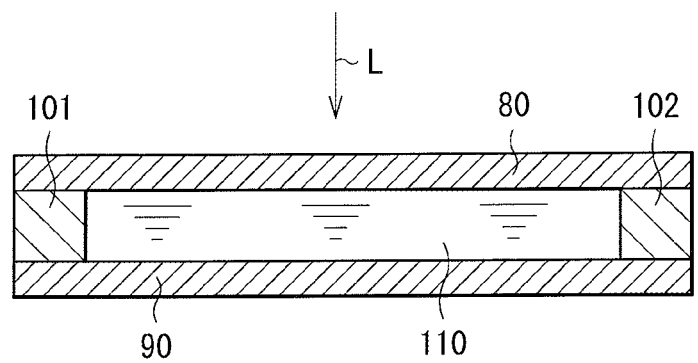
FIG. 3 is a cross sectional view illustrating a structure of a main section of a liquid crystal shutter using the liquid crystal material of the embodiment of the invention.
Figure 4:
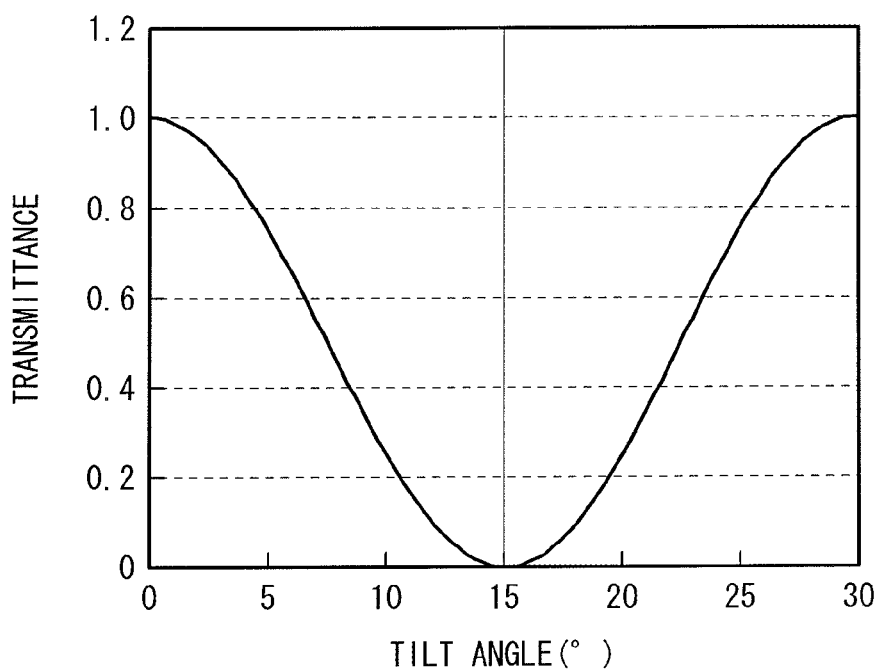
FIG. 4 is a diagram illustrating a correlation between transmittance and a tilt angle in electroclinic effect.

Further, the liquid crystal material of the invention is applied to, for example, a liquid crystal shutter. FIG. 3 is a cross sectional view illustrating a structure of the main section of the liquid crystal shutter.

The liquid crystal shutter herein described is a device to open and close a light path by using the liquid crystal material. Specific examples of such a liquid crystal shutter include shutter glasses used for viewing a three dimensional video. In the shutter glasses, two liquid crystal shutters are used as one pair (for right and left eyes). In this case, to provide parallax between a right eye image and a left eye image, the two liquid crystal shutters have different polarization characteristics.

The liquid crystal shutter illustrated in FIG. 3 has a structure similar to that of the liquid crystal optical space modulation device illustrated in FIG. 2. Specifically, in the liquid crystal shutter, transparent substrates 80 and 90 as a pair of substrates are separated by electrodes 101 and 102. A liquid crystal layer 110 containing the liquid crystal material of the invention is enclosed between the transparent substrates 80 and 90.

In the liquid crystal shutter, in the case where the light L enters the transparent substrate 80, whether the light L is transmitted is controlled by presence of an electric field applied between the electrodes 101 and 102. Therefore, shutter (open and close) operation for the light L is freely performed.

According to the liquid crystal shutter, the liquid crystal layer 110 contains the liquid crystal material of the invention. Thus, transmittance is able to be precisely controlled. Therefore, shutter operation is able to be stably and surely executed.

EXAMPLES

Next, a description will be given in detail of examples of the invention.

Examples 1 to 39

First, phase systems of liquid crystal materials shown in Formula 1(1) to Formula 1(35), Formula 2, and Formula 3(1) to Formula 3(2) were examined. The results illustrated in Table 1 and Table 2 were obtained. In examining the phase systems, phase types of the liquid crystal material were identified by observing the phase state of the liquid crystal material by a polarization microscope while the liquid crystal material is heated by a hot stage. In this case, presence of phase transition was checked by measuring temperature of the liquid crystal material with the use of differential scanning calorimetry. The phase transition temperature was temperature at which phase transition occurred after the liquid crystal material was heated (temperature was increased) from the crystal phase until an isotropic phase was shown. X phase was a phase in which the liquid crystal phase type was not able to be identified, and was regarded as a smectic phase other than the smectic 'A' phase or the smectic 'C' phase.

As a representative of the series of liquid crystal materials, synthesis procedures of the materials shown in Formula 1(10), Formula 2, Formula 3(1), and Formula 3(2) will be hereinafter described.

In synthesizing the liquid crystal material of Formula 1(10), first, benzoyl chloride was dropped into 4,4'-biphenol pyridine solution, and the resultant was subsequently stirred all night at room temperature. The obtained precipitated substance was filtrated, and subsequently 4'-hydroxy-4-biphenyl benzoate was obtained by column chromatography with the use of silica-gel. Subsequently, 4'-hydroxy-4-biphenyl benzoate was dispersed into acetic acid. Thereafter, while temperature was kept at 15 degree centigrade, nitric acid was dropped into the resultant, water was further added thereto, and the resultant was stirred. The obtained precipitated substance was recrystallized by ethanol and acetic acid, and therefore 4'-hydroxy-3'-nitro-4-biphenyl benzoate was obtained. Subsequently, tetrahydrofuran solution composed of 4'-hydroxy-3'-nitro-4-biphenyl benzoate, triphenyl phosphine, and 3,3-dimethylbutyl-1-ol was put into a flask substituted with argon gas (Ar). Thereafter, azodicarboxylic diethyl tetrahydrofuran solution was dropped into the resultant, which was stirred all night at room temperature. Subsequently, after the solvent was volatilized, by using column chromatography, 4'-(3,3-dimethylbutyloxy)-3'-nitro(1,1'-biphenyl)-4-yl benzoate was obtained. Subsequently, 4'-(3,3-dimethylbutyloxy)-3'-nitro(1,1'-biphenyl)-4-yl benzoate methanol solution was added with lithium hydroxide solution, and the resultant was stirred all night at room temperature. Subsequently, after the solvent was volatilized, neutralization was performed by hydrochloric acid, and a target substance was extracted by ethyl ether. Subsequently, dehydration was performed by magnesium sulfate, and the solvent was volatilized. Thereafter, by using column chromatography, 4'-(3,3-dimethylbutyloxy)-3'-nitro(1,1'-biphenyl)-4-ol was obtained. Subsequently, dichloromethane solution composed of 4'(3,3-dimethlbutyloxy)-3'-nitro(1,1'-biphenyl)-4-ol, p-octyloxybenzoic acid, and 4-dimethylaminepyridine was added to 1-(3-(dimethylamino)-propyl)-3-ethylcarbodimide methiodine, and the resultant was subsequently stirred all night at room temperature. Subsequently, after the solution was washed with water, the resultant was separated and dried over sodium sulfate. Finally, after the solvent was volatilized, the liquid crystal material of Formula 1(10) was obtained by using column chromatography.

In synthesizing the liquid crystal material of Formula 2, a procedure similar to that of synthesizing the liquid crystal material of Formula 1(10) was performed, except that p-dodecaoxybenzoic acid was used instead of p-octyloxybenzoic acid. In synthesizing the liquid crystal materials of Formula 3(1) and Formula 3(2), a procedure similar to that of synthesizing the liquid crystal material of Formula 1(10) was performed, except that 1,1-dimethylpentyl-1-ol and 5,5-dimethylhexyl-1-ol were respectively used instead of 3,3-dimethylbutyl-1-ol.

In the case where the liquid crystal materials of Formula 3(1) and Formula 3(2) were used by mixture, the liquid crystal materials of Formula 3(1) and Formula 3(2) were mixed at a weight ratio of 1:1, and was subsequently stirred while temperature was increased up to temperature at which the isotropic phase was shown.

TABLE 1

| Table 1 | Liquid crystal material | Liquid crystal phase | X phase | Smectic C phase | Smectic A phase | Nematic phase | Isotropic phase |
|---|---|---|---|---|---|---|---|
| | | Liquid crystal phase (phase transition temperature: degree centigrade) | | | | | |
| Example 1 | Formula 1(1) | — | Absent | 46.0 | 71.4 | 80.3 | 82.6 |
| Example 2 | Formula 1(2) | — | Absent | −19.6 | 31.0 | 67.9 | 84.0 |
| Example 3 | Formula 1(3) | — | −2.5 | 5.5 | 24.3 | 31.4 | 65.0 |
| Example 4 | Formula 1(4) | — | Absent | 2.55 | 89.0 | 100.7 | 106.0 |
| Example 5 | Formula 1(5) | — | Absent | 83.8 | 94.7 | 148.1 | 155.8 |
| Example 6 | Formula 1(6) | — | Absent | 51.0 | 112.3 | 121.5 | 122.0 |
| Example 7 | Formula 1(7) | — | Absent | 43.9 | 50.0 | 74.0 | 85.8 |
| Example 8 | Formula 1(8) | — | Absent | Absent | 18.3 | 123.7 | 134.2 |
| Example 9 | Formula 1(9) | — | Absent | Absent | 56.0 | 96.8 | 121.7 |
| Example 10 | Formula 1(10) | — | Absent | −1.5 | 78.0 | 119.8 | 122.5 |

TABLE 1-continued

| Table 1 | Liquid crystal material | Liquid crystal phase | X phase | Smectic C phase | Smectic A phase | Nematic phase | Isotropic phase |
|---|---|---|---|---|---|---|---|
| Example 11 | Formula 1(11) | — | Absent | Absent | 30.0 | 70.2 | 73.3 |
| Example 12 | Formula 1(12) | — | Absent | Absent | 48.0 | 142.5 | 149.2 |
| Example 13 | Formula 1(13) | — | Absent | <−40.0 | 56.7 | 95.1 | 96.4 |
| Example 14 | Formula 1(14) | — | Absent | <−40.0 | 98.2 | 103.0 | 104.0 |
| Example 15 | Formula 1(15) | — | Absent | Absent | <−40.0 | 53.6 | 59.4 |
| Example 16 | Formula 1(16) | — | Absent | Absent | 102.2 | 155.2 | 160.2 |
| Example 17 | Formula 1(17) | — | 18.3 | 91.7 | 98.7 | 105.5 | 117.3 |
| Example 18 | Formula 1(18) | — | Absent | −19.4 | 43.0 | 102.8 | 109.1 |
| Example 19 | Formula 1(19) | — | Absent | Absent | 61.0 | 78.6 | 82.7 |
| Example 20 | Formula 1(20) | — | Absent | Absent | <−40.0 | 141.9 | 145.8 |

TABLE 2

| Table 2 | Liquid crystal material | Liquid crystal phase | X phase | Smectic C phase | Smectic A phase | Nematic phase | Isotropic phase |
|---|---|---|---|---|---|---|---|
| Example 21 | Formula 1(21) | — | Absent | 35.8 | 124.0 | 128.7 | 154.6 |
| Example 22 | Formula 1(22) | — | Absent | 46.5 | 65.5 | 94.0 | 127.0 |
| Example 23 | Formula 1(23) | — | Absent | Absent | 90.0 | 110.9 | 125.3 |
| Example 24 | Formula 1(24) | — | Absent | Absent | 26.9 | 44.5 | 45.5 |
| Example 25 | Formula 1(25) | — | −19.0 | 48.0 | 71.4 | 115.8 | 118.3 |
| Example 26 | Formula 1(26) | — | Absent | Absent | <−40.0 | 63.5 | 67.0 |
| Example 27 | Formula 1(27) | — | Absent | −0.2 | 96.1 | 110.8 | 117.7 |
| Example 28 | Formula 1(28) | — | Absent | <−40.0 | 16.7 | 99.4 | 106.7 |
| Example 29 | Formula 1(29) | — | Absent | Absent | −10.2 | 105.7 | 130.0 |
| Example 30 | Formula 1(30) | — | Absent | 57.5 | 99.0 | 101.3 | 105.6 |
| Example 31 | Formula 1(31) | — | Absent | 66.0 | 87.0 | 115.2 | 132.2 |
| Example 32 | Formula 1(32) | — | Absent | 40.0 | 80.0 | 120.0 | 124.5 |
| Example 33 | Formula 1(33) | — | Absent | −13.0 | 48.0 | 75.5 | 85.2 |
| Example 34 | Formula 1(34) | — | Absent | Absent | <−40.0 | 70.5 | 92.0 |
| Example 35 | Formula 1(35) | — | Absent | 57.5 | 99.0 | 101.3 | 105.6 |
| Example 36 | Formula 2 | — | Absent | Absent | −7.0 | Absent | 60.0 |
| Example 37 | Formula 3(1) | — | Absent | Absent | 2.0 | Absent | 117.0 |
| Example 38 | Formula 3(2) | — | Absent | 7.0 | 125.0 | Absent | 131.0 |
| Example 39 | Formula 3(1) + 3(2) | — | Absent | Absent | −3.0 | 91.0 | 92.0 |

In Examples 1 to 39, in the course of increasing temperature, a plurality of phases were observed between the crystal phase and the isotropic phase. In the case where a single liquid crystal material was used, the nematic phase was observed between the smectic 'A' phase and the isotropic phase in Examples 1 to 35, while the nematic phase was not observed in Examples 36 to 38. Further, in the case where the same type of liquid crystal materials were used singly or by mixture, the nematic phase was not observed in Examples 37 and 38 in which the liquid crystal material was used singly, while the nematic phase was observed in Example 39 in which the liquid crystal materials were used by mixture. Accordingly, it was confirmed that according to the type or combination of the liquid crystal materials, the nematic phase was observed between the isotropic phase and the smectic 'A' phase in some cases, while the nematic phase was not observed between the isotropic phase and the smectic 'A' phase in some cases.

Next, an evaluation-use cell was formed by using the liquid crystal material and various characteristics of the liquid crystal molecules and the evaluation-use cell were examined. The results illustrated in Table 3 were obtained.

In forming the evaluation-use cell, first, an alignment film (polyimide) was formed on one face of two glass substrates with ITO. Thereafter, rubbing was performed by a roller with a buff material. Subsequently, the two glass substrates were bonded with each other to become in a cell state by using an ultraviolet cured resin in which silica balls (diameter: 2.4 μm) were dispersed. Finally, the liquid crystal material was injected into the cell under temperature at which the isotropic phase was obtained.

In examining the width of the temperature zone of the nematic phase, based on the results illustrated in Table 1 and Table 2, the phase transition temperature of the nematic phase/smectic 'A' phase was subtracted from the phase transition temperature of the isotropic phase/nematic phase to calculate the temperature range showing the nematic phase. Further, in the case where the alignment state of the liquid crystal molecules was examined, the liquid crystal molecules were observed by a polarization microscope, and whether the alignment state was uniform was visually judged.

In examining the transmittance, after temperature of the evaluation-use cell was adjusted to the level at which the liquid crystal material showed the smectic 'A' phase in a dark state (state that electric field was not applied), the transmitted light amount was measured by a spectral photometer to obtain the transmittance. In calculating the transmittance, the transmitted light amount under the following conditions was regarded as 100%. Under such conditions, the optical axis of the evaluation-use cell in the state that an electric field was not applied was matched with the optical axis of the polarizing plate in the polarization microscope, and two polarizing plates were arranged so that each polarization directions were in parallel with each other.

TABLE 3

| Table 3 | Liquid crystal material | Nematic phase Presence | Width of temperature zone (degree centigrade) | Alignment state | Transmittance (%) |
|---|---|---|---|---|---|
| Example 10 | Formula 1(10) | Present | 2.7 | Uniform | 0.1 |
| Example 36 | Formula 2 | Absent | — | Not uniform | 10.2 |
| Example 37 | Formula 3(1) | Absent | — | Uniform | 2.3 |
| Example 38 | Formula 3(2) | Absent | — | Uniform | 3.1 |
| Example 39 | Formula 3(1) + Formula 3(2) | Present | 1.0 | Uniform | 0.2 |

In Examples 10 and 39 in which the nematic phase was observed between the isotropic phase and the smectic 'A' phase, the alignment state of the liquid crystal molecules was uniform, and the transmittance was kept under 1%. In this case, the width of the temperature zone of the nematic phase was 1 degree centigrade or more. Meanwhile, in Examples 36 to 38 in which the nematic phase was not observed, the alignment state of the liquid crystal molecules was not uniform in some cases, and the transmittance exceeded 1%. Such nonuniform alignment state was baton alignment state in which the alignment state was uniform only locally ("Liquid crystal handbook," edited by Liquid crystal handbook editorial board, Maruzen Co., 2000). Accordingly, it was confirmed that in the liquid crystal materials showing the nematic phase between the isotropic phase and the smectic 'A' phase, the alignment state of the liquid crystal molecules was uniform and thus the transmittance in a dark state was kept low.

While the invention has been described with reference to the embodiment and the examples, the invention is not limited to the aspects described therein, and various modifications may be made. For example, the liquid crystal material of the invention may be applied not only to the liquid crystal display device, the liquid crystal optical space modulation device, and the liquid crystal shutter, but also to other optical devices.

The present application contains subject matter related to that disclosed in Japanese Priority Patent Application JP 2009-253361 filed in the Japan Patent Office on Nov. 4, 2009, the entire contents of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. A liquid crystal material that has a phase system continuously showing an isotropic phase, a nematic phase, and a smectic 'A' phase in this order as temperature changes from a higher state to a lower state, and shows electroclinic effect in the smectic 'A' phase, wherein the smectic 'A' phase occurs at least in a temperature range from 20 degrees centigrade to 50 degrees centigrade, inclusive, wherein the liquid crystal material is a mixture of two or more liquid crystal materials that do not independently have a phase system continuo showing isotropic phase a nematic phase and a smectic 'A' phase in this order as temperature changes from higher state to lower state.

2. The liquid crystal material according to claim 1, wherein a width of temperature zone in which the liquid crystal material shows the nematic phase is 1 degree centigrade or more.

3. A liquid crystal display device having a liquid crystal layer between a pair of substrates, the liquid crystal layer containing a liquid crystal material that has a phase system continuously showing an isotropic phase, a nematic phase, and a smectic 'A' phase in this order as temperature changes from a higher state to a lower state and shows electroclinic effect in the smectic 'A' phase, wherein the smectic 'A' phase occurs at least in a temperature range from 20 degrees centigrade to 50 degrees centigrade, inclusive, wherein the liquid crystal material is a mixture of two or more liquid crystal materials that do not independently have a phase system continuously showing an isotropic phase, a nematic phase, and a smectic 'A' phase in this order as temperature changes from higher state to lower state.

4. A liquid crystal optical space modulation device having a liquid crystal layer between a pair of substrates, the liquid crystal layer containing a liquid crystal material that has a phase system continuously showing an isotropic phase, a nematic phase, and a smectic 'A' phase in this order as temperature changes from a higher state to a lower state and shows electroclinic effect in the smectic 'A' phase, wherein the smectic 'A' phase occurs at least in a temperature range from 20 degrees centigrade to 50 degrees centigrade, inclusive, wherein the liquid crystal material is a mixture of two or more liquid crystal materials that do not independently have a phase system continuously showing an isotropic phase, a nematic phase, and a smectic 'A' phase in this order as temperature changes from higher state to lower state.

5. A liquid crystal shutter having a liquid crystal layer between a pair of substrates, the liquid crystal layer containing a liquid crystal material that has a phase system continuously showing an isotropic phase, a nematic phase, and a smectic 'A' phase in this order as temperature changes from a higher state to a lower state and shows electroclinic effect in the smectic 'A' phase, wherein the smectic 'A' phase occurs at least in a temperature range from 20 degrees centigrade to 50 degrees centigrade, inclusive, wherein the liquid crystal material is a mixture of two or more liquid crystal materials that do not independently have a phase system continuously showing an isotropic phase, a nematic phase, and a smectic 'A' phase in this order as temperature changes from higher state to lower state.

6. The liquid crystal material according to claim 1, wherein the two or more liquid crystal materials in the mixture comprise the liquid crystal materials in Formula 3-1 and Formula 3-2.

7. A liquid crystal material that has a phase system continuously showing an isotropic phase, a nematic phase, and a smectic 'A' phase in this order as temperature changes from a higher state to a lower state, and shows electroclinic effect in the smectic 'A' phase, wherein the smectic 'A' phase occurs at least in a temperature range from 20 degrees centigrade to 50 degrees centigrade, inclusive, wherein the liquid crystal material is selected from the group consisting of the liquid crystal materials in Formula 1-8, Formula 1-15, Formula 1-20, Formula 1-26, Formula 1-28, Formula 1-29, and Formula 1-34.

8. The liquid crystal material according to claim 7, wherein the liquid crystal material comprises the liquid crystal material in Formula 1-8.

9. The liquid crystal material according to claim 7, wherein the liquid crystal material comprises the liquid crystal material in Formula 1-15.

10. The liquid crystal material according to claim 7, wherein the liquid crystal material comprises the liquid crystal material in Formula 1-20.

11. The liquid crystal material according to claim 7, wherein the liquid crystal material comprises the liquid crystal material in Formula 1-26.

12. The liquid crystal material according to claim 7, wherein the liquid crystal material comprises the liquid crystal material in Formula 1-28.

13. The liquid crystal material according to claim 7, wherein the liquid crystal material comprises the liquid crystal material in Formula 1-29.

14. The liquid crystal material according to claim 7, wherein the liquid crystal material comprises the liquid crystal material in Formula 1-34.

* * * * *